(12) United States Patent
Kuga et al.

(10) Patent No.: US 11,932,427 B1
(45) Date of Patent: Mar. 19, 2024

(54) UNMANNED AIRCRAFT

(71) Applicants: ACSL Ltd., Tokyo (JP); NJS Co., Ltd., Tokyo (JP)

(72) Inventors: Soki Kuga, Tokyo (JP); Yusuke Inagaki, Osaka (JP); Patrik Ken Takeuchi, Kanagawa (JP)

(73) Assignees: ACSL Ltd., Tokyo (JP); NIS Co., Ltd., Tokyo (JP)

( * ) Notice: Subject to any disclaimer, the term of this patent is extended or adjusted under 35 U.S.C. 154(b) by 0 days.

(21) Appl. No.: 17/753,444

(22) PCT Filed: Aug. 16, 2021

(86) PCT No.: PCT/JP2021/029899
§ 371 (c)(1),
(2) Date: Mar. 3, 2022

(87) PCT Pub. No.: WO2023/021548
PCT Pub. Date: Feb. 23, 2023

(51) Int. Cl.
*B64U 20/77* (2023.01)
*B64U 10/14* (2023.01)

(52) U.S. Cl.
CPC .............. *B64U 20/77* (2023.01); *B64U 10/14* (2023.01)

(58) Field of Classification Search
CPC ........ B64U 20/77; B64U 10/14; B64U 60/20; B64U 2101/26; B64U 2101/31; B64U 2101/70
See application file for complete search history.

(56) References Cited

U.S. PATENT DOCUMENTS

| | | | | |
|---|---|---|---|---|
| 3,838,835 | A * | 10/1974 | Kling | B64U 30/26 |
| | | | | 416/129 |
| 2002/0060267 | A1 * | 5/2002 | Yavnai | G05D 1/0038 |
| | | | | 180/7.4 |
| 2016/0286128 | A1 | 9/2016 | Zhou | |
| 2017/0050726 | A1 * | 2/2017 | Yamada | B64C 27/20 |
| 2018/0077350 | A1 * | 3/2018 | Grenier | B64C 39/024 |

(Continued)

FOREIGN PATENT DOCUMENTS

| | | | | |
|---|---|---|---|---|
| CN | 115973468 | A * | 4/2023 | |
| DE | 102013104447 | A1 * | 10/2014 | A47L 1/02 |

(Continued)

OTHER PUBLICATIONS

Certificate for Application of the Exception to Lack of Novelty of Invention for Japanese Patent Application No. 2022-507890.

*Primary Examiner* — Christopher P Ellis
(74) *Attorney, Agent, or Firm* — McDonnell Boehnen Hulbert & Berghoff LLP

(57) ABSTRACT

Provided is an unmanned aircraft which is capable of stably taking off. In one example, the unmanned aircraft has an aircraft body which includes an information acquisition device, a plurality of rotary wings, and a protective member disposed around the rotary wings. Each of the rotary wings has a rotation axis which is tilted with respect to a vertical direction by a given angle, such that the rotary wings generate a forward thrust force. The aircraft body has a lower edge which includes a middle lower edge and a forward lower edge, wherein the protective member has a lower edge including the forward lower edge. The forward lower edge is located above the middle lower edge, and the forward lower edge has a rear end located backward of a rear end of the rotary wing.

6 Claims, 9 Drawing Sheets

(56) References Cited

U.S. PATENT DOCUMENTS

| | | | |
|---|---|---|---|
| 2019/0206266 A1* | 7/2019 | Taveira | G08G 5/04 |
| 2021/0024212 A1* | 1/2021 | Andeweg | B64C 39/024 |
| 2021/0080337 A1* | 3/2021 | Al-Hannabi | G01M 5/0033 |
| 2021/0147078 A1 | 5/2021 | Kuroiwa | |
| 2021/0163131 A1 | 6/2021 | Kuroiwa | |
| 2021/0171196 A1 | 6/2021 | Kuroiwa | |
| 2023/0034243 A1* | 2/2023 | Ceborahs | B64U 60/20 |
| 2023/0043301 A1* | 2/2023 | Okamoto | G01L 1/146 |
| 2023/0182932 A1* | 6/2023 | Rodrigues | B05C 21/005 |
| | | | 118/712 |
| 2023/0286556 A1* | 9/2023 | Qian | B64U 10/00 |
| 2023/0288326 A1* | 9/2023 | Yamamoto | G02F 1/3551 |
| 2023/0310684 A1* | 10/2023 | Rister | B64F 5/30 |
| | | | 422/24 |
| 2023/0373661 A1* | 11/2023 | Uchibori | B64U 30/299 |

FOREIGN PATENT DOCUMENTS

| | | | | |
|---|---|---|---|---|
| JP | 2018-030430 A | 3/2018 | | |
| JP | 2018-165131 A | 10/2018 | | |
| JP | 2020-164166 A | 10/2020 | | |
| WO | 2019198155 A1 | 10/2019 | | |
| WO | WO-2019190325 A1 * | 10/2019 | | B08B 1/002 |

\* cited by examiner

UNMANNED AIRCRAFT

RELATED DISCLOSURE

The present application is a U.S. National Phase Application under 35 U.S.C. § 371 of International Application No. PCT/JP2021/029899 filed Aug. 16, 2021, the disclosure of which is incorporated herein by reference in its entirety.

TECHNICAL FIELD

The present invention relates to an unmanned aircraft configured to fly based on a manipulation signal received from the outside.

BACKGROUND ART

As a method of inspecting the inside of a sewage pipe, there have been known a method in which an inspector moves inside a sewage pipe to visually inspect the inside of the sewage pipe, and a method in which a wheeled vehicle equipped with a camera is driven to travel inside a sewage pipe to image the inside of the sewage pipe. In these inspection methods, the inspector is likely to be exposed to danger due to toxic gas generated in the sewage pipe, or control of the wheeled vehicle is likely to become difficult due to rise in the water level in the sewage pipe.

Therefore, the below-mentioned Patent Document 1 proposes an inspection method using an unmanned aircraft. An aircraft body of this unmanned aircraft is configured such that a dimension in a width direction thereof is less than a dimension thereof in a front-rear direction thereof, and is provided with a plurality of rotary wings, so as to allow the unmanned aircraft to easily move along a direction in which a sewage pipe extends. The rotary wings are configured to blow air downwardly and backwardly, thereby generating a lift force and a thrust force. An inspector can remotely manipulate this unmanned aircraft to image the inside of the sewage pipe, so that it becomes possible to perform the inspection while ensuring safety of the inspector, and mitigating the influence of the water level in the sewage pipe However, the unmanned aircraft described in the Patent Document 1 is equipped with rotary wings mainly for generating a lift force, and a rotary wing mainly for generating a thrust force, separately, so that it is apt to increase in size. Thus, the unmanned aircraft is likely to have difficulty in flying inside a sewage pipe having a relatively small inner diameter.

Therefore, the present inventors carried out a study on employing a rotary wing capable of simultaneously generating a lift force and a thrust force. Specifically, the present inventors conducted research on a configuration in which a rotation axis of a rotary wing is tilted with respect to a vertical direction by a given angle such that the rotary wing blows air downwardly and backwardly. This configuration makes it possible to obtain a lift force and a thrust force without providing separate rotary wings as in the unmanned aircraft described in Patent Document 1, and thereby achieving a more compact configuration.

CITATION LIST

[Patent Document]
Patent Document 1: PCT International Publication No. WO2019/198155

SUMMARY OF INVENTION

[Technical Problem]

However, when employing the rotary wing configured to blow air downwardly and backwardly, an airflow is likely to become unstable during takeoff of the unmanned aircraft, causing the aircraft body to suddenly largely tilt forwardly. This gives rise to a problem that a forward part of a lower end of the aircraft body interferes with an inner bottom surface of the sewage pipe, and therefore the unmanned aircraft becomes failing to stably take off.

As used in this specification, the term "takeoff" means that an unmanned aircraft which remains stationary on a given surface (e.g., inner bottom surface of a sewage pipe) is lifted upwardly. Further, the term "forward-tilt" means that an unmanned aircraft is in a posture where it is tilted forwardly with respect to a posture where the unmanned aircraft which remains stationary on a horizontal surface.

The present invention has been made to solve the above problem, and an object thereof is to provide an unmanned aircraft capable of stably taking off.

[Solution to Technical Problem]

In order to achieve the above object, the present invention provides an unmanned aircraft configured to fly based on a manipulation signal received from outside. The unmanned aircraft comprises an aircraft body which comprises: an information acquisition device for acquiring information regarding an object around the aircraft body; a rotary wing for blowing air downwardly to generate a lift force; and a protective member disposed around the rotary wing to protect the rotary wing, the aircraft body being configured such that a dimension in a width direction thereof is less than a dimension in a front-rear direction thereof, wherein: the rotary wing has a rotation axis which is tilted with respect to a vertical direction by a given angle, such that the rotary wing generates a forward thrust force; and the aircraft body has a lower edge which comprises a middle lower edge located in a middle of the aircraft body in the front-rear direction, and a forward lower edge located forward of the middle lower edge, and wherein: the protective member has a lower edge comprising the forward lower edge; the forward lower edge is located above the middle lower edge; and the forward lower edge has a rear end located backward of a rear end of the rotary wing.

Preferably, in the unmanned aircraft of the present invention, the forward lower edge is formed to linearly extend forwardly and upwardly from the side of the middle lower edge.

Preferably, in the unmanned aircraft of the present invention, the protective member is formed with an opening which opens, to outside, a space lateral to the rotary wing in the width direction.

More preferably, in the above unmanned aircraft, the rotary wing is disposed in a position corresponding to the forward lower edge in the front-rear direction.

[Effect of Invention]

The present invention makes it possible to provide an unmanned aircraft capable of stably taking off.

DESCRIPTION OF EMBODIMENTS

<Configuration of Unmanned Aircraft>

With reference to FIGS. 1 to 6, the configuration of an unmanned aircraft 1 (hereinafter referred to as "aircraft 1") according to one embodiment of the present invention will be described. As used in this specification, in the aircraft 1 which is positioned such that a width direction and a front-rear direction thereof orthogonal to each other is coincident with a horizontal direction, the left side when looking forward of the aircraft 1 is referred to as "left", and the right side when looking forward of the aircraft 1 is referred to as "right". That is, a right-left direction is coincident with the width direction of the aircraft 1. Further, the upper side of a vertical direction is referred to as "up", and the lower side of the vertical direction is referred to as "down".

Figure 1:
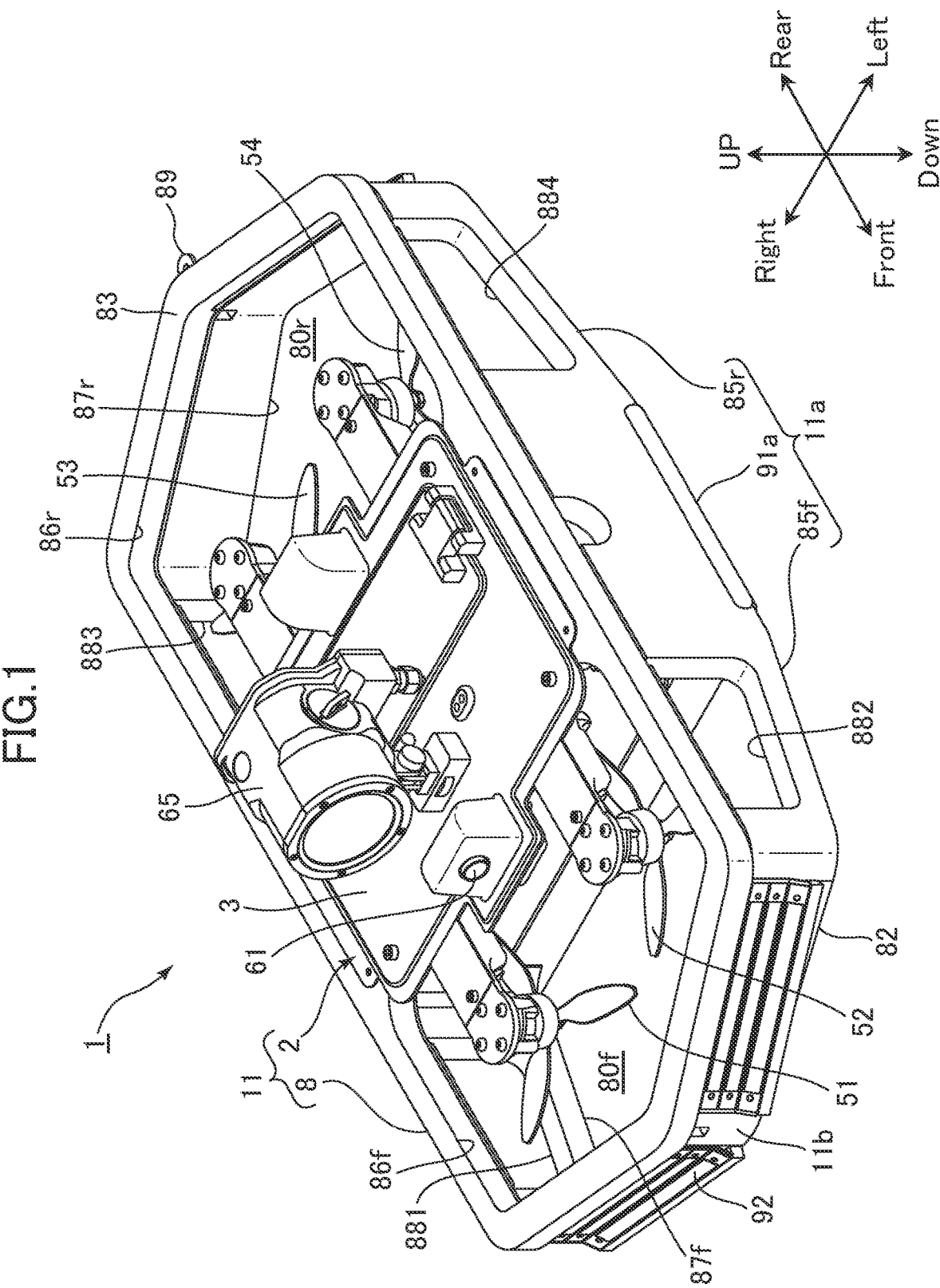
FIG. 1 is a perspective view showing an unmanned aircraft according to one embodiment of the present invention.
Figure 2:
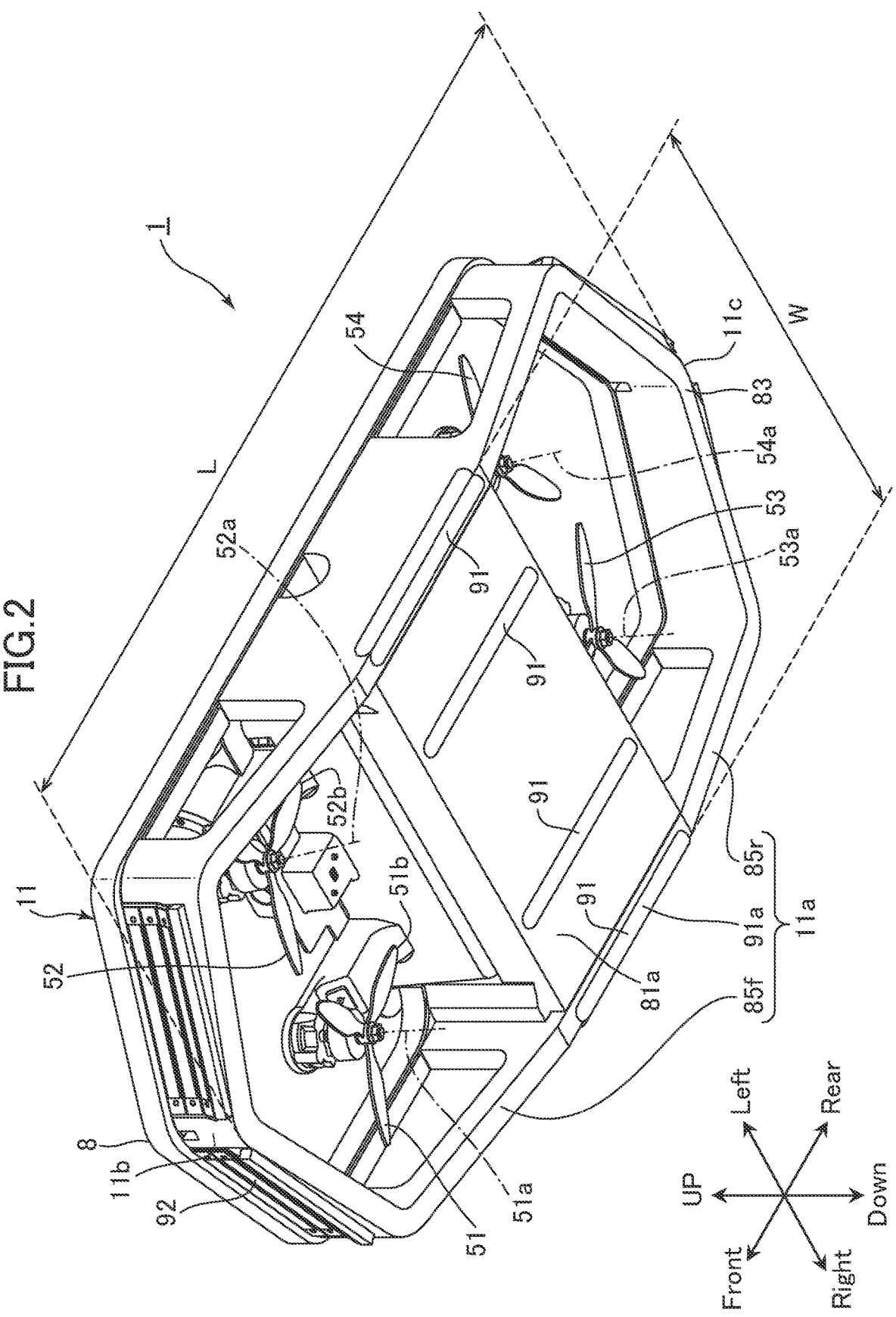
FIG. 2 is a perspective view showing the unmanned aircraft in FIG. 1.
Figure 3:
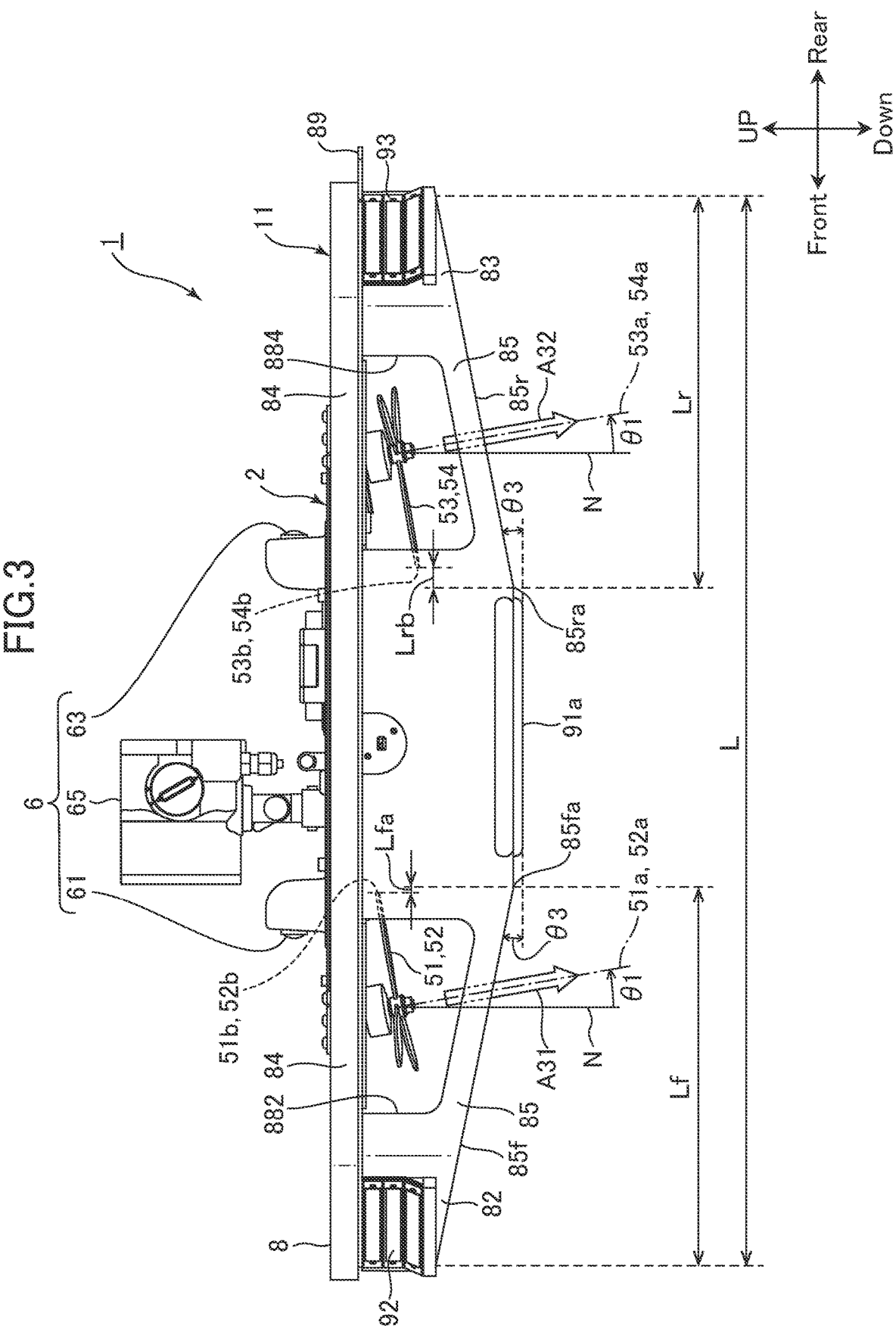
FIG. 3 is a side view showing the unmanned aircraft in FIG. 1.
Figure 4:
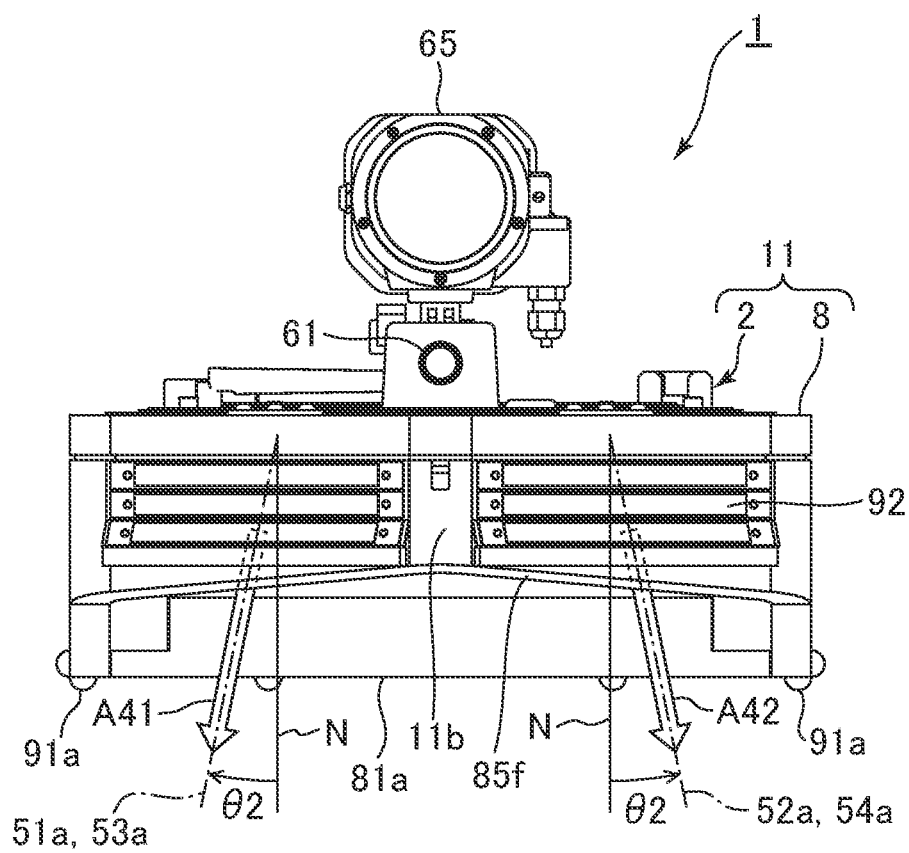
FIG. 4 is a front view showing the unmanned aircraft in FIG. 1.
Figure 5:
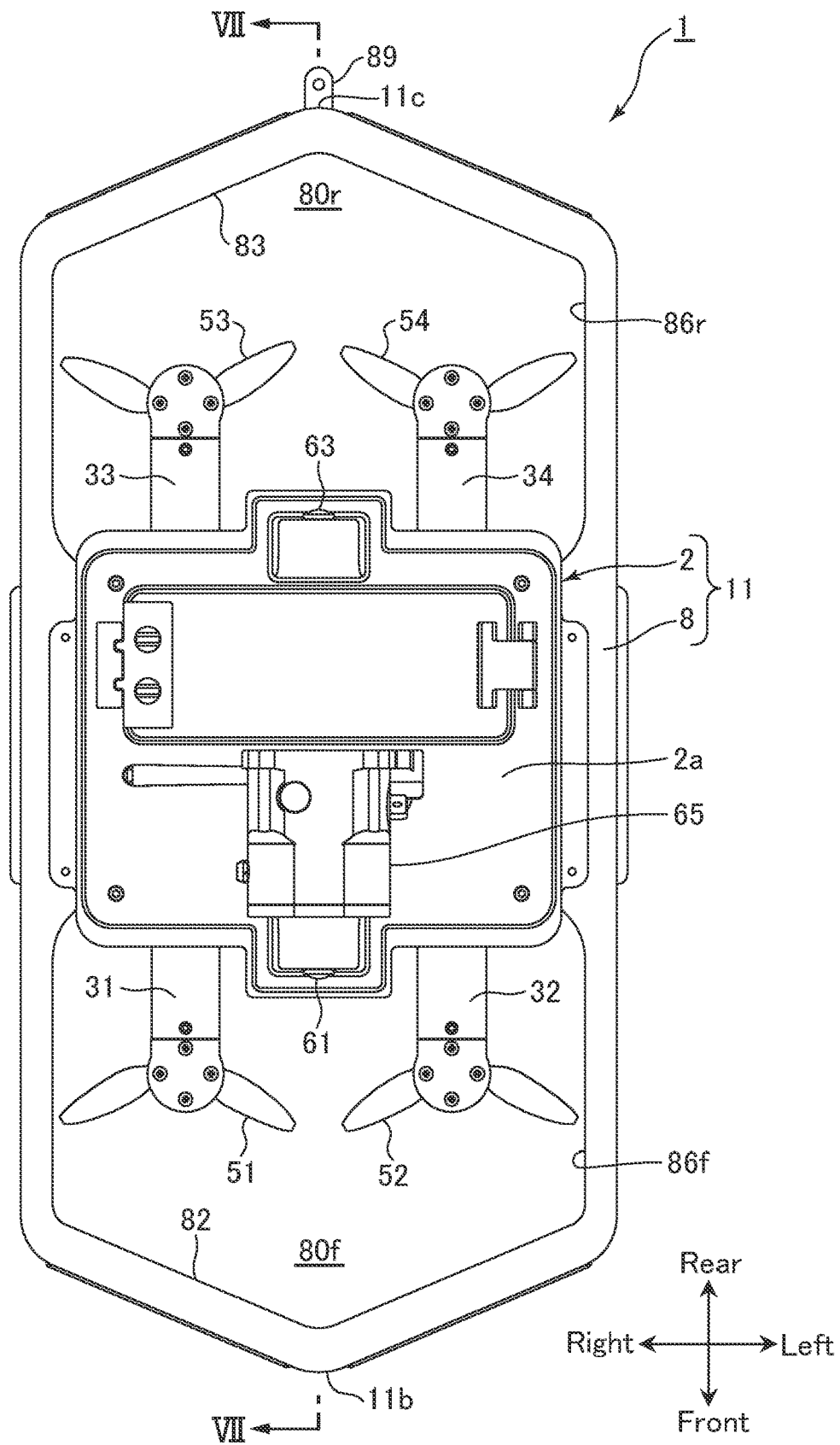
FIG. 5 is a top plan view showing the unmanned aircraft in FIG. 1.
Figure 6:
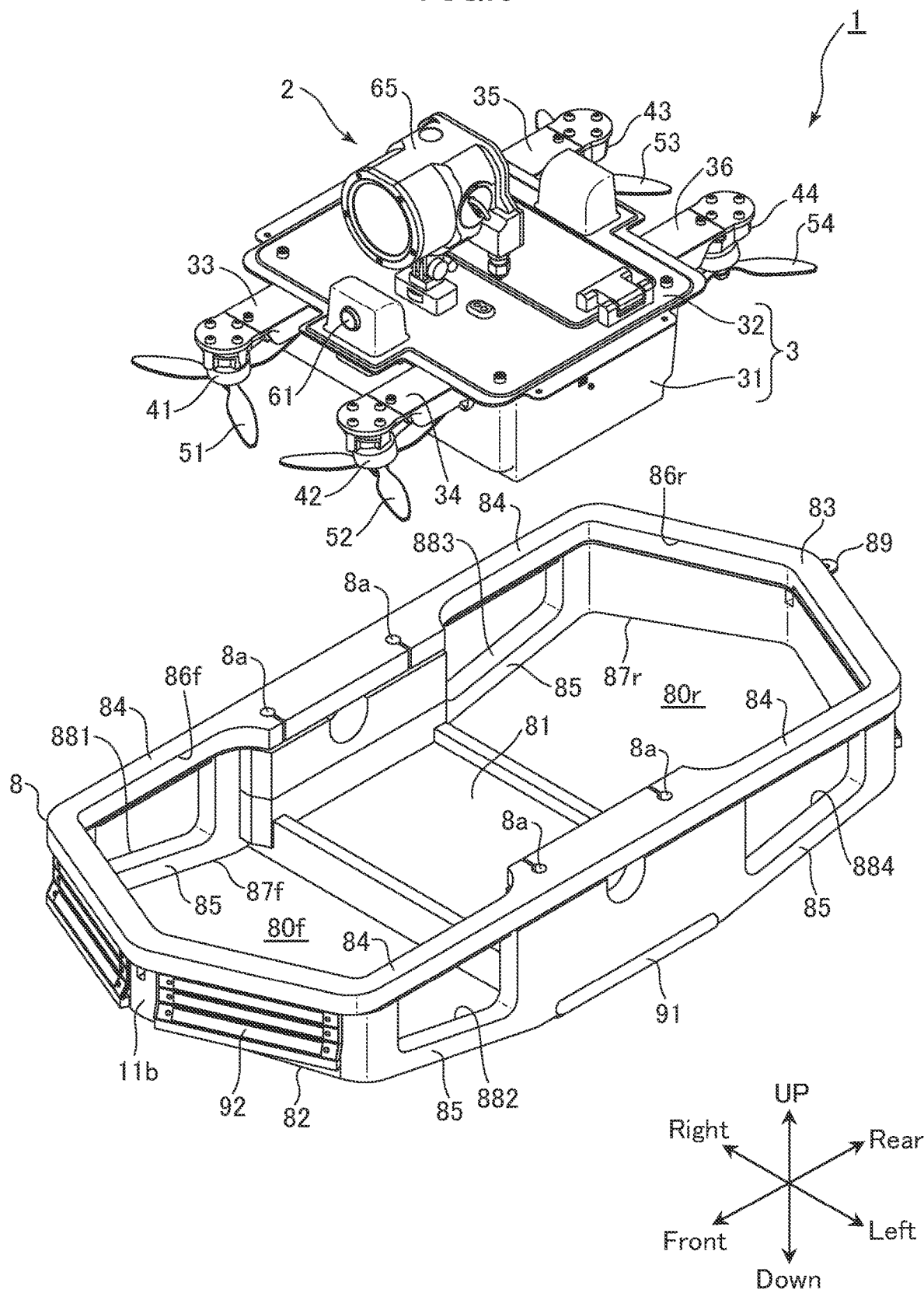
FIG. 6 is a perspective view showing the unmanned aircraft in FIG. 1.

FIG. 1 is a perspective view showing the aircraft 1 as viewed from thereabove, and FIG. 2 is a perspective view showing the aircraft 1 as viewed from therebelow. FIG. 3 is a side view showing the aircraft 1 as viewed from the left side thereof. FIG. 4 is a front view showing the aircraft 1, and FIG. 5 is a top plan view showing the aircraft 1. FIG. 6 is a perspective view showing the after-mentioned main unit 2 and protective member 8 which are separated from each other, as viewed from thereabove.

The aircraft 1 is used to acquire information regarding the inside of a non-illustrated sewage pipe. An aircraft body 11 of the aircraft 1 has a longitudinally-long shape to allow the aircraft 1 to easily move along a direction in which the sewage pipe extends. Specifically, the aircraft body 11 illustrated in FIG. 2 is configured such that a dimension W thereof between opposed lower edges 11*a* in the width direction is less than a dimension L of each of the lower edges 11*a* in the front-rear direction. Each of the lower edges 11*a* comprises a middle lower edge 91*a*, a forward lower edge 85*f*, and a backward lower edge 85*r* each of which will be described in detail later.

The aircraft body 11 comprises a main unit 2, and a protective member 8. As shown in FIG. 6, the main unit 2 comprises a casing 3, four motors 41 to 44, and four rotary wings 51 to 54. As shown in FIG. 3, the main unit 2 further comprises an information acquisition device 6.

As shown in FIG. 6, the casing 3 comprises a casing body 31 and a lid member 32. Each of the casing body 31 and the lid member 32 is formed of a lightweight and high-rigidity material (e.g., carbon fiber-reinforced plastic). A non-illustrated housing space is formed inside the casing body 31. The housing space has an opening on top thereof. Four arms 33 to 36 are provided on an outer surface of the casing body 31. Specifically, two arms 33, 34 extend forwardly from a front surface of the casing body 31, and two arms 35, 36 extend backwardly from a rear surface of the casing body 31. The arms 33, 34 extent approximately parallel to each other while being spaced apart from each other in the right-left direction. The arms 35, 36 also extent approximately parallel to each other while being spaced apart from each other in the right-left direction.

Electrical components such as a battery, a control device and a wireless communication device are housed in the housing space of the casing body 31. The lid member 32 closes the opening of the housing space to form a watertight seal with respect to a peripheral edge of the casing body 31, thereby preventing water from entering the housing space.

Each of the motors 41 to 44 is an actuator configured such that an output shaft thereof is rotated in response to receiving electric power. Each of the motors 41 to 44 is attached to a lower surface of a corresponding one of the arms 33 to 36, such that the output shaft thereof extends downwardly. A non-illustrated signal line is provided to penetrate through each of the arms 33 to 36, and each of the motors 41 to 44 is electrically connected to the control device housed in the housing space of the casing body 31.

Each of the rotary wings 51 to 54 has a plurality of blades around a corresponding one of four rotation axes 51*a* to 54*a*, and is fixed to the output shaft of a corresponding one of the motors 41 to 44. As shown in FIG. 3, each of the rotation axes 51*a* to 54*a* is positioned such that it is tilted backwardly with respect to a straight line N extending in the vertical direction, by a given angle $\theta 1$. The angle $\theta 1$ is about 10°. Further, as shown in FIG. 4, each of the rotation axes 51*a* to 54*a* is positioned such that it is tilted toward the outside of the aircraft body 11 with respect to the straight line N by a given angle $\theta 2$.

The information acquisition device 6 is provided to acquire information regarding an object around the aircraft body 11. As shown in FIG. 3, the information acquisition device 6 comprises a forward camera 61, a backward camera 63, and a central camera 65. The forward camera 61 and the backward camera 63 are provided, respectively, at a front end and a rear end of the lid member 32 of the casing body 31. The central camera 65 is fixed to the lid member 32 at a position between the forward camera 61 and the backward camera 63. Each of the forward camera 61, the backward camera 63 and the central camera 65 is electrically connected to the control device housed in the housing space of the casing body 31. For example, an infrared camera may be used as the central camera 65. Further, for example, a measurement device such as LiDAR (Light Detection And Ranging) may be used in place of the central camera 65.

The protective member 8 is formed of a material having a specific gravity less than water and high impact absorption performance (e.g., polypropylene foam). The protective member 8 is formed to be approximately symmetrical in the front-rear direction and in the width direction. As shown in FIG. 6, the protective member 8 comprises: a main unit setup part 81 located in the middle thereof; a front cover 82 located at a position spaced apart forwardly from the main unit setup part 81; and a rear cover 83 located at a position spaced apart backwardly from the main unit setup part 81.

As shown in FIG. 2, a plurality of cushions 91 are fixed onto a bottom surface 81*a* of the main unit setup part 81. Each of the cushions 91 is made of a rubber material harder than a material forming the protective member 8, and formed in a rod shape linearly extending along the front-rear direction. As shown in FIG. 3, a lower edge of each of the cushions 91 fixed onto the bottom surface 81*a* corresponds to the middle lower edge 91a which is located in the middle of the aircraft body 11. Further, two illuminators 92, 93 are fixed, respectively, onto outer surfaces of the front cover 82 and the rear cover 83. Each of illuminator 92, 93 is composed of a tape-shaped LED. The rear cover 83 is further provided with a wire connection part 89 to which a non-illustrated wire (e.g., piano wire).

As shown in FIG. 6, the main unit setup part 81, the front cover 82 and the rear cover 83 are connected together by four pairs of upper and lower bars 84, 85. Each of the pairs of upper and lower bars 84, 85 are spaced apart from each other in the vertical direction. Thus, four openings 881 to 884 are formed between respective pairs of upper and lower bars 84, 85 (i.e., in opposed sidewalls of the protective member 8). Each of the forward lower edge 85f and the backward lower edge 85r corresponds to a lower edge of a corresponding one of the lower bars 85.

As shown in FIG. 3, the forward lower edge 85f is formed to linearly extend forwardly and upwardly from the side of the middle lower edge 91a. On the other hand, the backward lower edge 85r is formed to linearly extend backwardly and upwardly from the side of the middle lower edge 91a. Specifically, each of the forward lower edge 85f and the backward lower edge 85r is formed to extend obliquely upwardly by an angle θ3 with respect to the middle lower edge 91a, so that it is located above the middle lower edge 91a. The angle θ3 is about 8°. It should be noted here that each of the forward lower edge 85f and the backward lower edge 85r needs not necessarily be entirely located above the middle lower edge 91a. For example, a rear end 85fa of the forward lower edge 85f and a front end 85ra of the backward lower edge 85r may be located at the same height as that of the middle lower edge 91a.

The forward lower edge 85f is formed to occupy a sufficiently large region in the entirety of the lower edge 11a of the aircraft body 11. Specifically, the rear end 85fa of the forward lower edge 85f is located backward of a rear end 51b (52b) of the rotary wing 51 (52), in the front-rear direction. In order words, the rear end 85fa of the forward lower edge 85f is spaced apart backwardly from the rear end 51b (52b) of the rotary wing 51 (52) by a dimension Lfa. Further, a dimension Lf of the forward lower edge 85f in the front-rear direction is greater than L/4. As mentioned above, L means a dimension of the entire lower edge 11a of the aircraft body 11 of the aircraft 1 in the front-rear direction. Although the rear end of the rotary wing 51 (52) varies according to rotation of the rotary wing 51 (52), the term "rear end 51a (52b)" here means the rear end of the rotary wing 51 (52) when it is located at the backwardmost position.

On the other hand, the front end 85ra of the backward lower edge 85r is located forward of a front ends 53b (54b) of the rotary wing 53 (54), in the front-rear direction. In order words, the front end 85ra of the backward lower edge 85r is spaced apart forwardly from the front end 53b (54b) of the rotary wing 53 (54) by a dimension Lrb. Although the front end of the rotary wing 53 (54) varies according to rotation of the rotary wing 53 (54), the term "front end 53a (53b)" here means the front end of the rotary wing 53 (54) when it is located at the forwardmost position.

As shown in FIG. 6, a plurality of fixing holes 8a is formed in an upper end portion of the main unit setup part 81 of the protective member 8, and a non-illustrated fastener is placed in each of the fixing holes 8a. When the protective member 8 is attached to the main unit 2, the main unit 2 is set up in the main unit setup part 81, and a bottom surface and right and left surfaces of the main units 2 are covered by the main unit setup part 81, as shown in FIGS. 1 and 2. Further, the protective member 8 is disposed around the rotary wings 51 to 54.

Further, when the protective member 8 is attached to the main unit 2, a space surrounded by the main unit setup part 81, the front cover 82, the rear cover 83, the upper bars 84 and the lower bars 85 is divided into a forward space 80f and a backward space 80r, as shown in FIG. 1. The forward space 80f has an upper opening 86f and a lower opening 87f, and the backward space 80r has an upper opening 86r and a lower opening 87r. The rotary wings 51, 52 are arranged in the forward space 80f, and the rotary wings 53, 54 are arranged in the backward space 80r. The opening 881 is located on the right side of the forward space 80f, and the opening 882 is located on the left side of the forward space 80f. On the other hand, the opening 883 is located on the right side of the backward space 80r, and the opening 884 is located on the left side of the backward space 80r.

Further, when the protective member 8 is attached to the main unit 2, the rotary wings 52, 54 are arranged at positions overlapping the openings 882, 884, respectively, in side view, as shown in FIG. 3. In other words, the opening 882, 884 are arranged to open respective spaces on the left side of the rotary wings 52, 54 to the outside. Although not illustrated, the rotary wings 51, 53 are arranged at positions overlapping the openings 881, 883, respectively, in side view, and respective spaces on the right side of the rotary wings 51, 53 are opened to the outside through the openings 881, 883, in a similar manner.

The rotary wings 51, 53 are also arranged in a position corresponding to the forward lower edge 85f. In other words, the rotary wings 51, 53 are arranged within the range of the dimension Lf of the forward lower edge 85f, as shown in FIG. 3.

<Imaging of Inside of Sewage Pipe using Unmanned Aircraft>

Next, imaging of the inside of a sewage pipe using the unmanned aircraft 1 will be described. Upon being subjected to manipulation of an inspector, a non-illustrated remote controller transmits a manipulation signal corresponding to the manipulation to the outside. In the aircraft 1, the wireless communication device receives the manipulation signal, and, based on the received manipulation signal, the control device transmits control signals, respectively, to the motors 41 to 44.

The motors 41 to 44 rotate their output shafts at respective rotational speeds according to the control signals. Thus, the rotary wings 51 to 54 rotate about the rotation axes 51a to 54a, respectively. The rotary wings 51, 52 draw air into the forward space 80f through the upper opening 86f, and simultaneously blow air out from the lower opening 87f. The rotary wings 53, 54 draw air into the backward space 80r through the upper opening 86r, and simultaneously blow air out from the lower opening 87r.

As mentioned above, each of the rotational axes 51a to 54a of the rotary wings 51 to 54 is tilted backwardly with respect to the straight line N extending in the vertical direction by the angle θ1 (see FIG. 3), and further tilted toward the outside of the aircraft body 11 with respect to the straight line N by the angle θ2 (see FIG. 4). Thus, the rotary wings 51 to 54 blow air downwardly, backwardly, and outwardly as indicated by the arrowed lines A31, A32 in FIG. 3 and the arrowed lines A41, A42 in FIG. 4.

As a result, a force oriented upwardly, forwardly, and inwardly (i.e., in a direction opposite to a direction in which the rotary wings 51 to 73 blow out air) is applied to the rotary wings 51 to 54. This force becomes a lift force that lifts the aircraft body 11 upwardly, and a thrust force that drives the aircraft body 11 forwardly, to allow the aircraft 1 to fly. Thus, the aircraft 1 does not need to be equipped with a rotary wing mainly for generating a lift force and a rotary wing mainly for generating a thrust force, separately, so that it becomes possible to achieve a more compact configuration. The aircraft 1 moves along a direction in which the sewage pipe extends, while flying. One end of the non-illustrated wire is connected to the wire connection part 89 of the protective member 8, and the wire is fed along with the movement of the aircraft 1.

During flight of the aircraft 1, the illuminators 92, 93 emit light to illuminate an area of the sewage pipe around the aircraft body 11, and each of the forward camera 61, the backward camera 63 and the central camera 65 images the illuminated area of the sewage pipe. Videos of the sewage pipe imaged by the forward camera 61 and the backward camera 63 are converted to a signal and transmitted to the inspector through the wireless communication device, in real time. The inspector manipulates the remote controller while checking videos displayed on a display based on the signal.

During flight of the aircraft 1, the protective member 8 protects the rotary wings 51 to 54 from interference with the sewage pipe. Further, the protective member 8 is formed of a material having a specific gravity less than water. Thus, even in a situation where the aircraft 1 lands on water, it generates a buoyant force to prevent submergence of the aircraft 1.

After completion of the flight, the aircraft 1 stops the rotation of the rotary wings 51 to 54, and lands on water inside the sewage pipe or on the inner bottom surface of the sewage pipe. The inspector pulls the wire to move the aircraft 1 toward the inspector and collect the aircraft 1.

<Behavior of Unmanned Aircraft during Takeoff>

Figure 7:
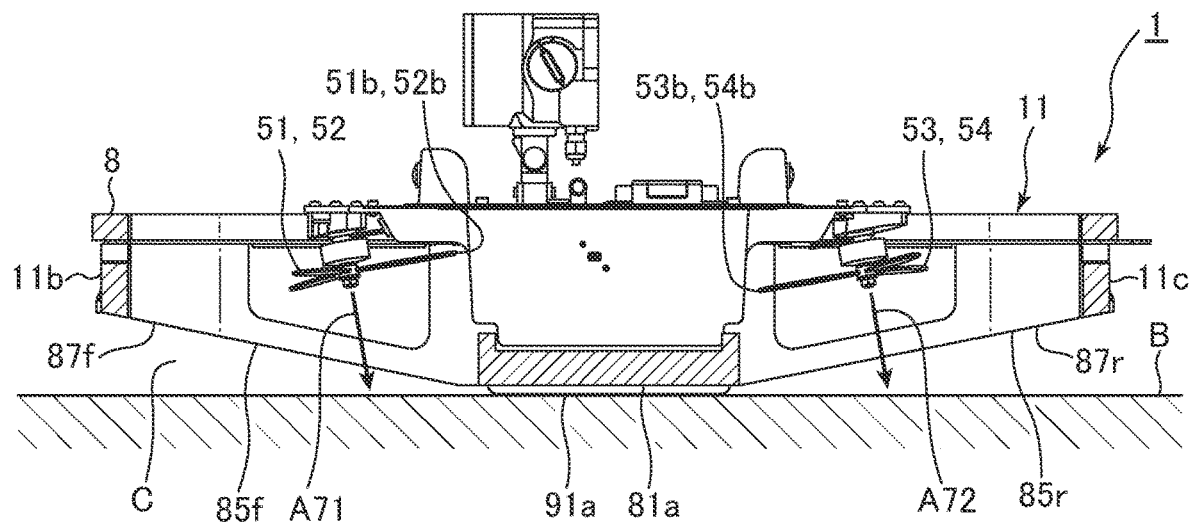
FIG. 7 is an explanatory diagram showing the unmanned aircraft in FIG. 1, during takeoff.
Figure 8:
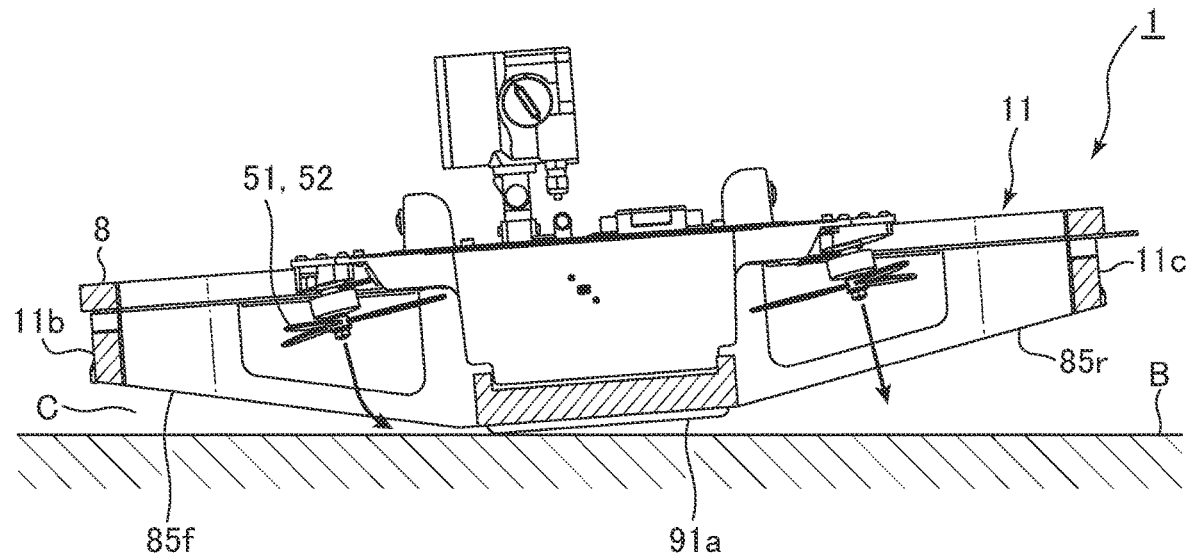
FIG. 8 is an explanatory diagram showing the unmanned aircraft in FIG. 1, during takeoff.
Figure 9:
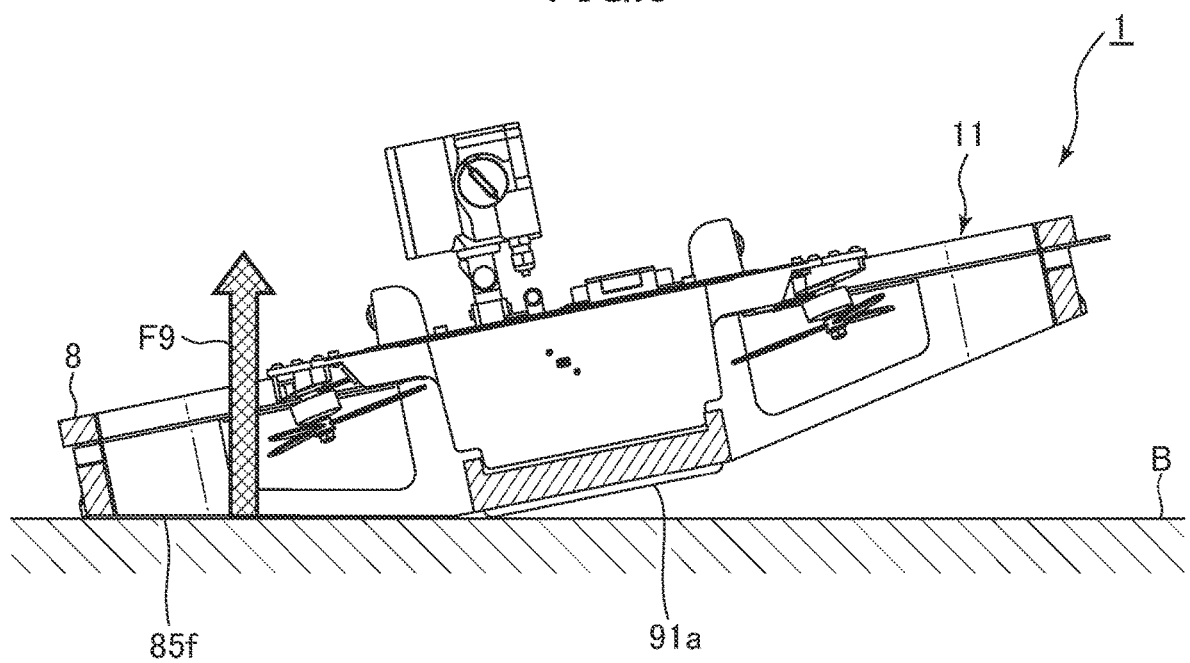
FIG. 9 is an explanatory diagram showing the unmanned aircraft in FIG. 1, during takeoff.
Figure 10:
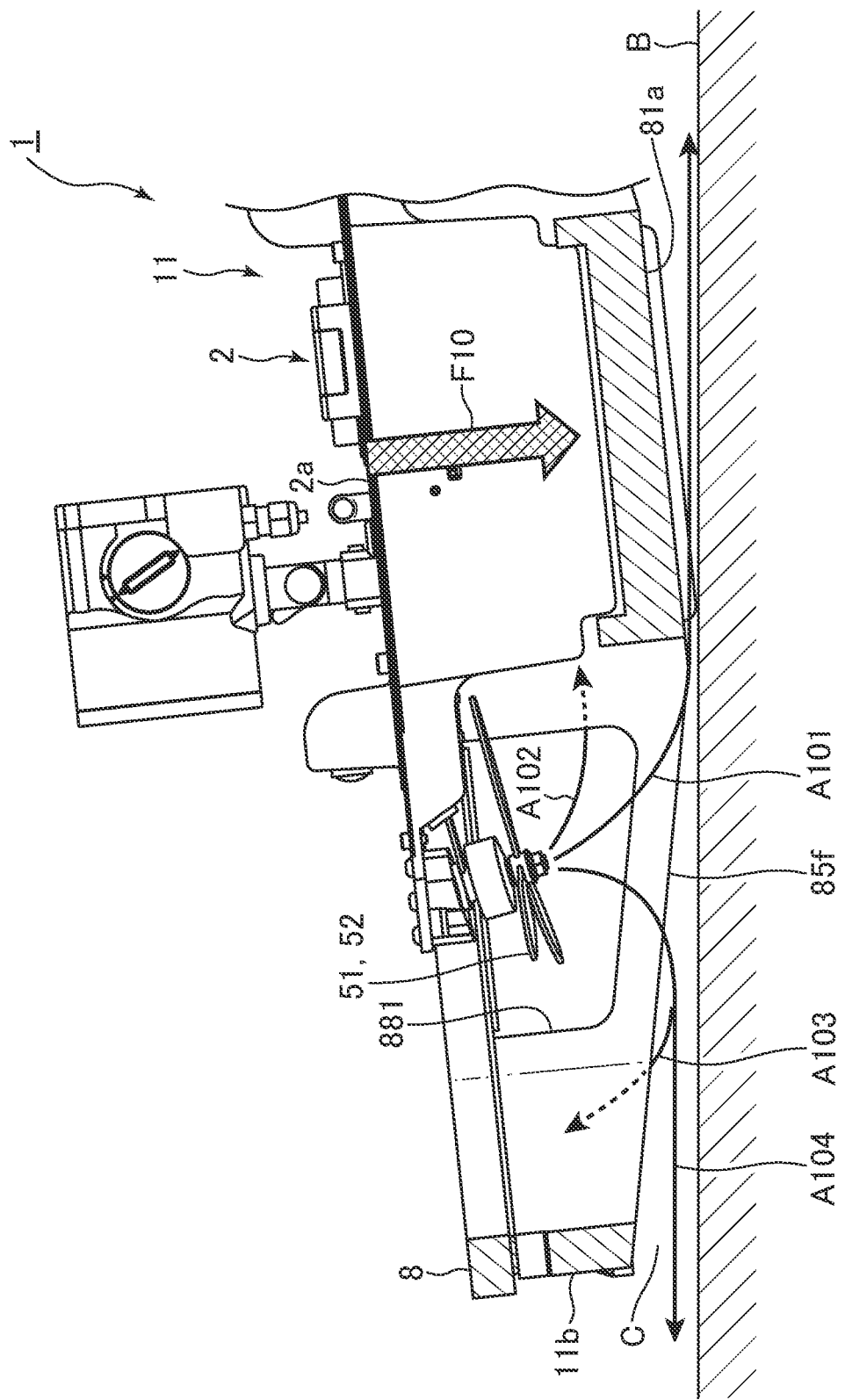
FIG. 10 is an explanatory diagram showing the unmanned aircraft in FIG. 1, during takeoff.

Next, with reference to FIGS. 7 to 10, the behavior of the aircraft 1 during takeoff will be described. FIGS. 7 to 10 are explanatory diagrams showing the aircraft 1 during takeoff. For facilitating understanding of the explanation, only the protective member 8 is shown in cross-section taken along the line VII-VII in FIG. 5. FIG. 7 shows a state in which the aircraft 1 remains stationary on an inner bottom surface B of a sewage pipe. FIG. 8 shows a state in which the aircraft 1 is tilted forwardly during takeoff, and FIG. 9 shows a state in which the aircraft 1 is more largely tilted forwardly during takeoff. FIG. 10 enlargedly shows the vicinity of a front end 11b of the aircraft body 11 in FIG. 8.

In FIG. 7, the aircraft 1 is placed on the inner bottom surface B of the sewage pipe in the middle lower edge 91a. As mentioned above, the middle lower edge 91a corresponds to the lower edge of each of the cushions 91 fixed to the bottom surface 81a of the protective member 8 (see FIG. 2). Thus, the cushions 91 come into contact with the inner bottom surface B of the sewage pipe, to suppress interference between the bottom surface 81a of the protective member 8 and the inner bottom surface B and thus suppress abrasion of protective member 8.

When the output shafts of the motors 41 to 44 start rotating for takeoff, air is blown downwardly, backwardly, and outwardly from the rotary wings 51 to 54, as indicated by the arrowed lines A71, A72. Most of this air is blown onto the inner bottom surface B through the lower openings 87f, 87r of the protective member 8.

In this process, due to changes in airflow caused by a curved shape of the inner bottom surface B of the sewage pipe, a lift force generated by the rotary wings 51, 52 arranged closer to the front end 11b of the aircraft body 11 can become less than a lift force generated by the rotary wings 53, 54 located closer to a rear end 11c of the aircraft body 11. In this case, the aircraft body 11 can be tilted forwardly (i.e., the aircraft 1 takes a posture wherein it is tilted forwardly with respect to a posture where it remains stationary on a horizontal surface), as shown in FIG. 8.

As mentioned above, in the aircraft 1 which is positioned such that the width direction thereof is coincident with the horizontal direction, the forward lower edge 85f of the protective member 8 is formed to extend obliquely upwardly with respect to the middle lower edge 91a, and is located above the middle lower edge 91a (see FIG. 3). Thus, even when the aircraft body 11 is tilted forwardly as shown in FIG. 8, a gap C is maintained between the forward lower edge 85f and the inner bottom surface B. This prevents interference between the forward lower edge 85f and the inner bottom surface B.

Here, when the aircraft body 11 is tilted forwardly, backward directivity of air blown out by the rotary wings 51, 52 is increased, so that air flows between the bottom surface 81a of the protective member 8 and the inner bottom surface B of the sewage pipe, as indicated by the arrowed line A101 in FIG. 10. As a result, when the pressure of air on the bottom surface 81a becomes lower than the pressure of air on an upper surface 2a of the main unit 2, a force F10 acts to press the aircraft body 11 against the inner bottom B. This force F10 is likely to hinder stable takeoff of the aircraft 1.

However, part of air blown out by the rotary wings 51, 52 is discharged outside the protective member 8 through the opening 881, as indicated by the arrowed line A102. Although not illustrated, the opening 882 also allows part of air blown out by the rotary wings 51, 52 to be discharged outside the protective member 8 therethrough.

Further, part of air blown out by the rotary wings 51, 52 is discharged outside the protective member 8 through the gap C between the forward lower edge 85f and the inner bottom surface B. Specifically, the air is discharged from the gap C leftwardly and rightwardly with respect to the protective member 8, as indicated by the arrowed line A103, and further discharged from gap C forwardly with respect to the protective member 8, as indicated by the arrowed line A104.

This reduces an increase in the flow rate of air flowing as indicated by the arrowed line A101. As a result, a difference between the air pressure on the bottom surface 81a and the air pressure on the upper surface 2a of the main unit 2 is also reduced.

When the aircraft body 11 is more largely tilted forwardly on a sudden, the forward lower edge 85f of the protective member 8 is brought into contact the inner bottom surface B of the sewage pipe, as shown in FIG. 9. As mentioned above, the forward lower edge 85f is formed to linearly extend forwardly and upwardly from the side of the middle lower edge 91a. Thus, the forward lower edge 85f is brought into contact with the inner bottom surface B over its entire length, and receives a force F9 from the inner bottom surface B. This inhibits the aircraft body 11 from being further tilted forwardly.

<Functions/effects>

Next, functions/effects based on the aircraft 1 will be described.

In the aircraft 1 configured as above, a lift force and a forward thrust force are simultaneously generated by the rotary wings 51 to 54 whose rotation axes 51a to 54a are tilted with respect to the vertical direction by a given angle. When the aircraft 1 takes off from a posture where the middle lower edge 91a of the aircraft body 11 thereof is in contact with the inner bottom of the sewage pipe B, the aircraft body 11 is likely to be tilted forwardly. However, since the forward lower edge 85f in the lower edge 11a of the aircraft body 11 is located above the middle lower edge 91a, it is possible to suppress interference between the forward lower edge 85f and the inner bottom surface B, even when the aircraft body 11 is tilted forwardly.

In the above embodiment, the rear end 85fa of the forward lower edge 85f is located backward of the rear end 51b (52b) of the rotary wing 51 (52) in the front-rear direction. According to this feature, during takeoff of the aircraft 1, part of air blown out by the rotary wings 51, 52 can be efficiently discharged outside the protective member 8 through the gap C between the forward lower edge 85f and the inner bottom surface B. This makes it possible to reduce an increase in the flow rate of air flowing between the bottom surface 81a of the protective member 8 and the inner bottom surface B of the sewage pipe, while protecting the rotary wings 51, 52 by the protective member 8. It is also possible to reduce the difference between the air pressure on the bottom surface 81a and the air pressure on the upper surface 2a of the main unit 2, and thus reduce the force F10 based on this pressure difference. As a result, it becomes possible to further suppress interference between the forward lower edge 85f and the inner bottom surface B, thereby allowing the aircraft 1 to stably taking off.

In the above embodiment, the forward lower edge 85f is formed to linearly extend forwardly and upward from the middle lower edge 91a.

According to this feature, when the aircraft body 11 is largely tilted forwardly on a sudden during takeoff of the aircraft 1, the linearly-extending forward lower edge 85f is brought into contact with the inner bottom surface B over a wide range thereof, so that it is possible to inhibit the aircraft body 11 from being further tilted forwardly. As a result, it becomes possible to allow the aircraft to more stably take off.

In the above embodiment, the protective member 8 is formed with the openings 881, 882 which open, to outside, spaces lateral to the rotary wings 51, 52 in the width direction.

According to this feature, when the aircraft body 11 is tilted forwardly during takeoff of the aircraft 1, part of air blown out by the rotary wings 51, 52 can be discharged outside the protective member 8 through the openings 881, 882. As a result, it becomes possible to reduce an increase in the flow rate of air flowing below the aircraft body 11, and the resulting difference between air pressures above and below the aircraft body 11. It also becomes possible to reduce the force F10 acting to press the aircraft body 11 against the inner bottom surface B, and thus further suppress the interference between the forward lower edge 85f of the aircraft body 11 and the inner bottom surface B, thereby allowing the aircraft 1 to more stably take off.

In the above embodiment, the rotary wings 51, 52 are arranged in a position corresponding to the forward lower edge 85f in the front-rear direction.

According to this feature, when the aircraft body 11 is tilted forwardly during takeoff of the aircraft 1, part of air blown out by the rotary wings 51, 52 can be discharged outside the protective member 8 through the gap C formed between the inner bottom surface B and the forward lower edge 85f. As a result, it becomes possible to reduce an increase in the flow rate of air flowing below the aircraft body 11, and the resulting difference between air pressures above and below the aircraft body 11. It also becomes possible to reduce the force F10 acting to press the aircraft body 11 against the inner bottom surface B, and thus further suppress the interference between the forward lower edge 85f of the aircraft body 11 and the inner bottom surface B, thereby allowing the aircraft 1 to more stably take off.

The embodiment described above is intended to facilitate understanding of the present invention, but is not intended to be construed as limiting the present invention. The elements equipped in the embodiment, and arrangements, materials, conditions, shapes and sizes, etc., thereof are not limited to those exemplified therein, but it should be understood that various changes and modifications may be appropriately made therein.

INDUSTRIAL APPLICABILITY

The present invention can be used in a water supply pipe, a sewage pipe, a drainage pipe, a tunnel, a duct, a pipe shafts, a gas pipe, etc.

LIST OF REFERENCE SIGNS

1: unmanned aircraft (aircraft)
11: aircraft body
11a: lower edge
51 to 54: rotary wing
51a to 54a: rotation axis
51b, 52b: rear end
6: information acquisition device
8: protective member
85f: forward lower edge
85fa: rear end
881 to 884: opening
91a: middle lower edge

The invention claimed is:

1. An unmanned aircraft configured to fly based on a manipulation signal received from outside, comprising an aircraft body which comprises: an information acquisition device for acquiring information regarding an object around the aircraft body; a rotary wing for blowing air downwardly to generate a lift force; and a protective member disposed around the rotary wing to protect the rotary wing, the aircraft body being configured such that a dimension in a width direction thereof is less than a dimension in a front-rear direction thereof, wherein:

the rotary wing has a rotation axis which is tilted with respect to a vertical direction by a given angle, such that the rotary wing generates a forward thrust force; and the aircraft body has a lower edge which comprises a middle lower edge located in a middle of the aircraft body in the front-rear direction, and a forward lower edge located forward of the middle lower edge, and wherein:

the protective member has a lower edge comprising the forward lower edge;

the forward lower edge is located above the middle lower edge; and the forward lower edge has a rear end located backward of a rear end of the rotary wing.

2. The unmanned aircraft as recited in claim 1, wherein the forward lower edge is formed to linearly extend forwardly and upwardly from the side of the middle lower edge.

3. The unmanned aircraft as recited in claim 1, wherein the protective member is formed with an opening which opens, to outside, a space lateral to the rotary wing in the width direction.

4. The unmanned aircraft as recited in claim 3, wherein the rotary wing is disposed in a position corresponding to the forward lower edge in the front-rear direction.

5. The unmanned aircraft as recited in claim 2, wherein the protective member is formed with an opening which opens, to outside, a space lateral to the rotary wing in the width direction.

6. The unmanned aircraft as recited in claim 5, wherein the rotary wing is disposed in a position corresponding to the forward lower edge in the front-rear direction.

* * * * *